US008251815B1

(12) United States Patent
Sullivan et al.

(10) Patent No.: US 8,251,815 B1
(45) Date of Patent: Aug. 28, 2012

(54) SYNCHRONIC CONSTRUCT OF TIME IMPLEMENTED WITHIN VIDEO GAMES AND OTHER COMPUTER SOFTWARE

(75) Inventors: Michael G. Sullivan, Concord, NC (US); Michael Alan Gardner, Indian Trail, NC (US); Jason Merrill, Monroe, NC (US)

(73) Assignee: Bank of America Corporation, Charlotte, NC (US)

( * ) Notice: Subject to any disclaimer, the term of this patent is extended or adjusted under 35 U.S.C. 154(b) by 768 days.

(21) Appl. No.: 12/142,301

(22) Filed: Jun. 19, 2008

(51) Int. Cl.
*A63F 9/24* (2006.01)
(52) U.S. Cl. .......................................... 463/31; 463/42
(58) Field of Classification Search .................... 463/31, 463/42
See application file for complete search history.

(56) References Cited

U.S. PATENT DOCUMENTS 5,983,197 A * 11/1999 Enta ................................ 705/16
6,768,975 B1 * 7/2004 Gill et al. ......................... 703/13

OTHER PUBLICATIONS

"The Oregon Trail", Oct. 1985, Minnesota Education Computing Corporation.*
"Where in the World is Carmen Sandiego?", 1993, Electronic Arts.*
"How to be Successfull in Rollercoaster Tycoon Games", Jun. 17, 2007, wikiHow.*
"Hearts Official Laws and Rules", Apr. 7, 2000, Mind Sports Worldwide.*

* cited by examiner

*Primary Examiner* — Omkar Deodhar
(74) *Attorney, Agent, or Firm* — Michael A. Springs; Moore and Van Allen, PLLC; Ryan P. Harris

(57) ABSTRACT

Time implementation feature for video games. The time feature employs a synchronic construct of time for use in a computer software program, including a video game. The synchronic construct of time comprises assigning to each action in the game a specific number of synchronic timekeeping units. The number of synchronic timekeeping units assigned to an action may approximate how long the action might take in real time and/or may be used to weight the importance of the action. The invention can be implemented via a stand-alone computing system or such a system interconnected with other platforms or data stores by a network, such as a corporate intranet, a local area network, or the Internet.

30 Claims, 14 Drawing Sheets

SYNCHRONIC CONSTRUCT OF TIME IMPLEMENTED WITHIN VIDEO GAMES AND OTHER COMPUTER SOFTWARE

RELATED APPLICATION

This application is related to the application entitled "Full Time On-Screen Assistance for Video Games and Other Computer Software", filed on even date herewith, by inventors Michael G. Sullivan, Michael Alan Gardner, and Jason Merrill, and assigned to Bank of America, the contents of which are fully incorporated herein by reference.

BACKGROUND

Most video game software programs include a feature that simulates the passage of time. Often, a video game software user is awarded points based on completing tasks within a defined period of time. Many video games implement a diachronic version of time during game play that employs a chronological approach, which means that time is measured in units and events are placed in order of occurrence. The chronological approach can consist of "real" time or a construct of time. Games that employ real time generally allow the user a certain amount of time, such as a specific number of seconds, to perform actions within the game. Other games present actions within a historical context, employing a continuum in which the game actions take place. Some games that utilize a historical context present a timeline to help track progress through the game.

No matter how diachronic time features are specifically implemented in video games, most share the characteristic that time passes continually within the game unless the user utilizes a "pause" feature. The pause feature enables the user to stop the game activity and take a break from playing the game without being penalized. The pause feature allows the user to resume the game wherever he or she left off.

There are a number of drawbacks to the use of diachronic implementations of time in video games. Real time may not correlate very well with the actions occurring within the game. In many cases, the game may require a construct of time that encompasses larger amounts of time than the real time that is passing during game play. Alternatively, the game may require a construct of time that encompasses smaller amounts of time than the real time that passes during game play. Further, diachronic timekeeping forces the user to activate a pause feature in order to avoid being penalized for stopping game play. As video games are often long lasting, it is important that the game allow for user interruption without the user losing the game or being penalized for being away from the game.

Playing video games is usually considered to be a leisure time pursuit. However, all of the above takes on even greater importance when taken in the context of the use of video games to educate or train people. Such training practices are gaining traction as schools and businesses begin to appreciate the power of using a video game environment to engage learners and train them to work their way through a decision-filled process. However, users undergoing training are even more in need of time features that are forgiving of interruptions than those who play for pleasure, as users undergoing training may be doing so in a busy work environment. Further, since users undergoing training are investing work or school time in playing the game, it would be extremely inefficient for them to be required to restart the game after every interruption. Thus, it is imperative that such users be able to navigate in a stop-and-start way through a video game software program without being penalized for pauses in play.

SUMMARY

Embodiments of the present invention provide a computer software program time feature that simulates the passage of time. The time feature employs a synchronic construct of time, comprising assigning to each action in the program a specific number of synchronic timekeeping units.

In at least some embodiments, the number of synchronic timekeeping units assigned to the action approximates how long the action might take in real time.

In at least some embodiments, the number of synchronic timekeeping units assigned to the action is used to weight the importance of the action.

In at least some embodiments, the synchronic timekeeping units are converted to a representation of real time.

In at least some embodiments, the time feature comprises a clock-like icon presented on-screen to the user.

In at least some embodiments, the time feature is provided in a video game software program.

In some embodiments, the invention is implemented via either a stand-alone instruction execution platform or such a platform interconnected with other platforms or data stores by a network, such as a corporate intranet, a local area network, or the Internet. A computer program product or computer program products contain computer programs with various instructions to cause the hardware to carry out, at least in part, the methods and processes of the invention. Data sets may include lists of "actions" wherein each action is assigned a specific number of synchronic timekeeping units. Data sets may include lists of historical high game scores or other data, such as a user's history of scores. Data sets may be stored locally or accessed over a network.

BRIEF DESCRIPTION OF THE DRAWINGS

FIG. 1 presents examples of a screen presented as the main screen of the ATM game. The time feature is represented by a depiction of the number of customers in line at the ATM and the number of customers who have moved to a line inside the bank due to dissatisfaction with the nonfunctional ATM.

FIG. 2 presents an example of a screen presented after the user has unseated an ATM component and is ready to proceed with repair and maintenance actions. FIG. 2 further presents an example of a screen presented after the user has proceeded with repair and maintenance actions.

FIG. 3 presents an example of a screen presented after the user has completed repair and maintenance actions for an ATM component.

FIG. 4 presents an example of a screen that the user sees when the user determines that he or she has completed all necessary repair and maintenance actions for the ATM.

FIG. 5 presents an example of a screen that the user sees when the user has taken so long with repair and maintenance actions that the customer line from inside the banking center extends all the way out the door. At this point, the user automatically loses the game and sees the screen depicted in FIG. 5.

DETAILED DESCRIPTION OF THE INVENTION

Figure 1:
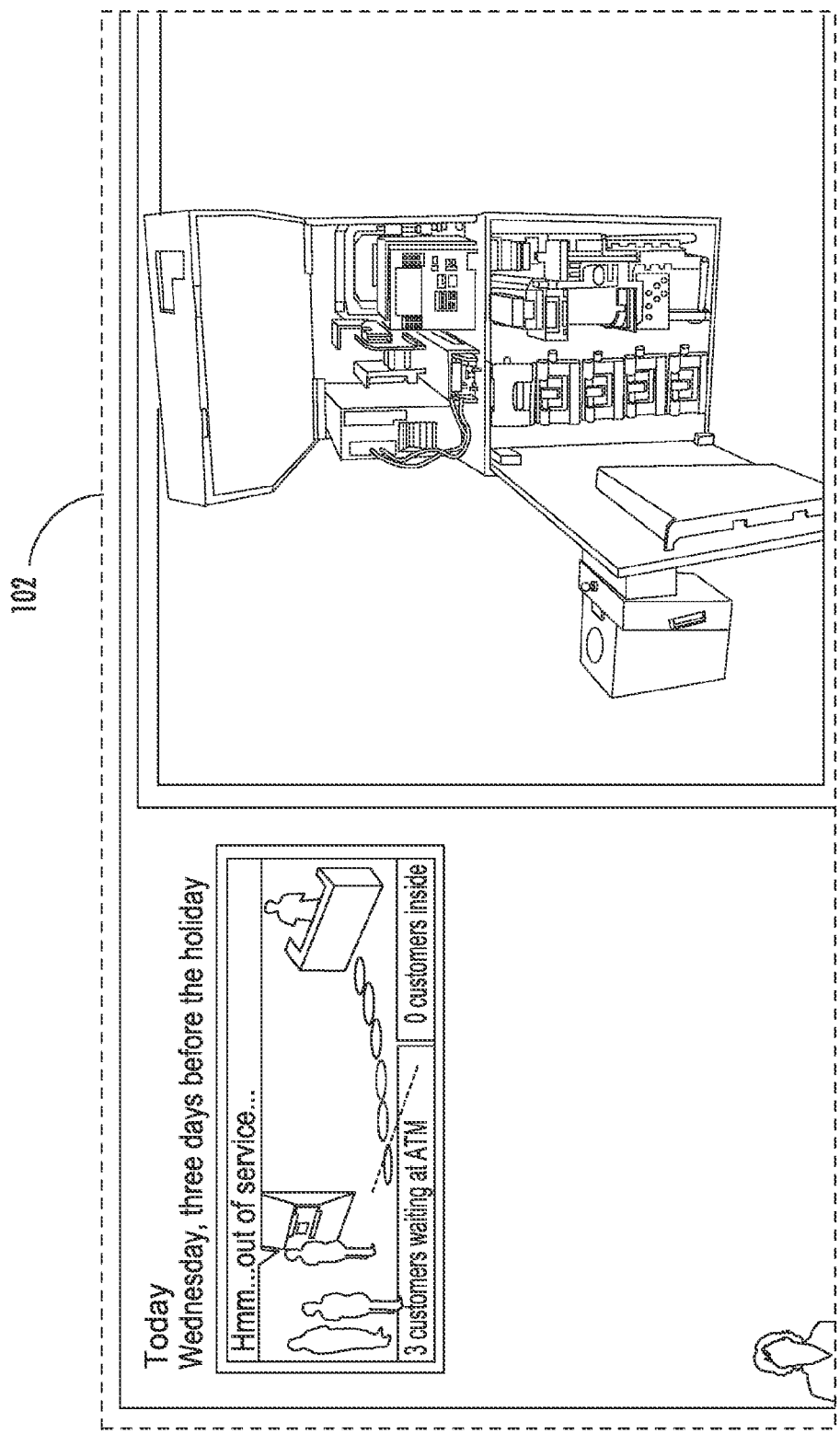
FIG. 1 presents example screen shots of user screens for the time feature.
Figure 1:
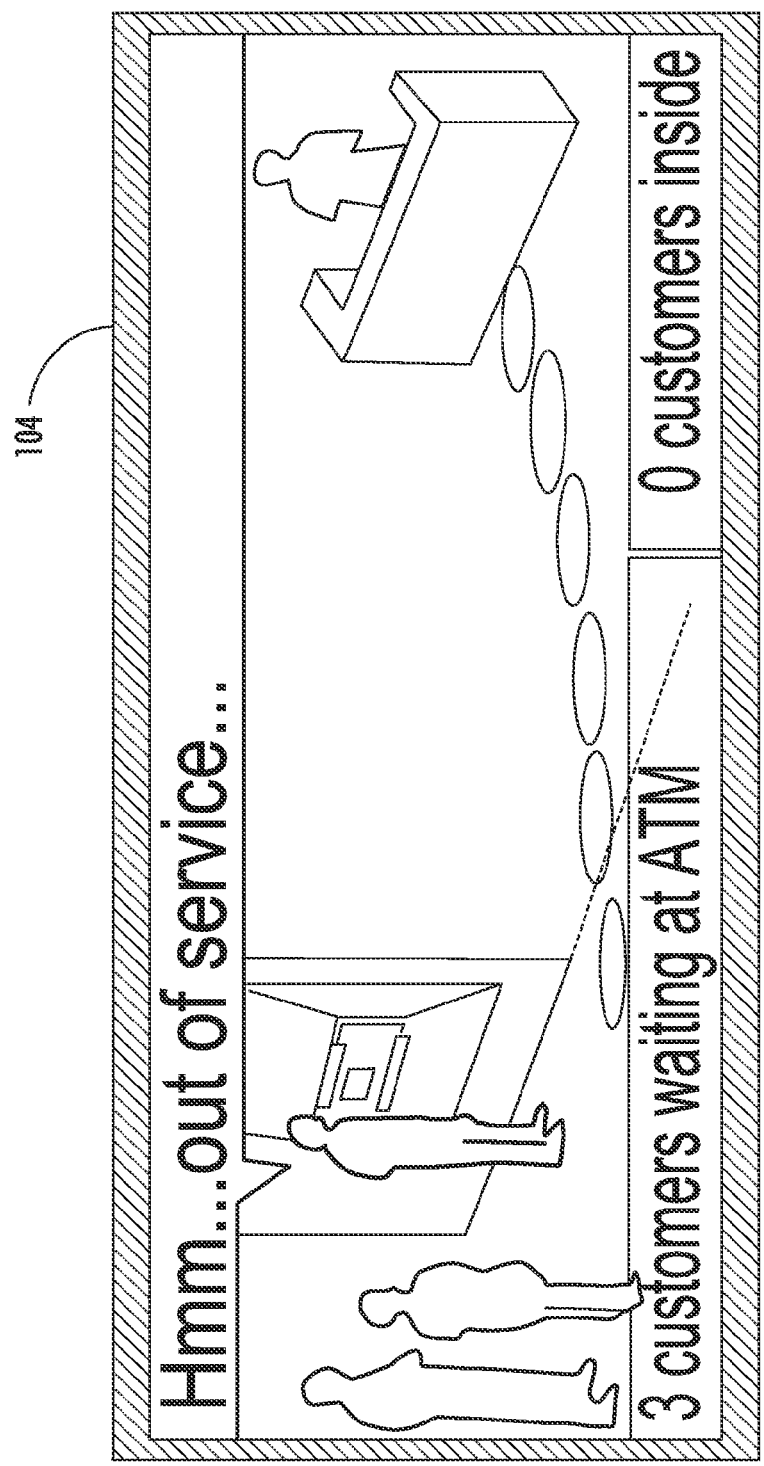
Figure 1:
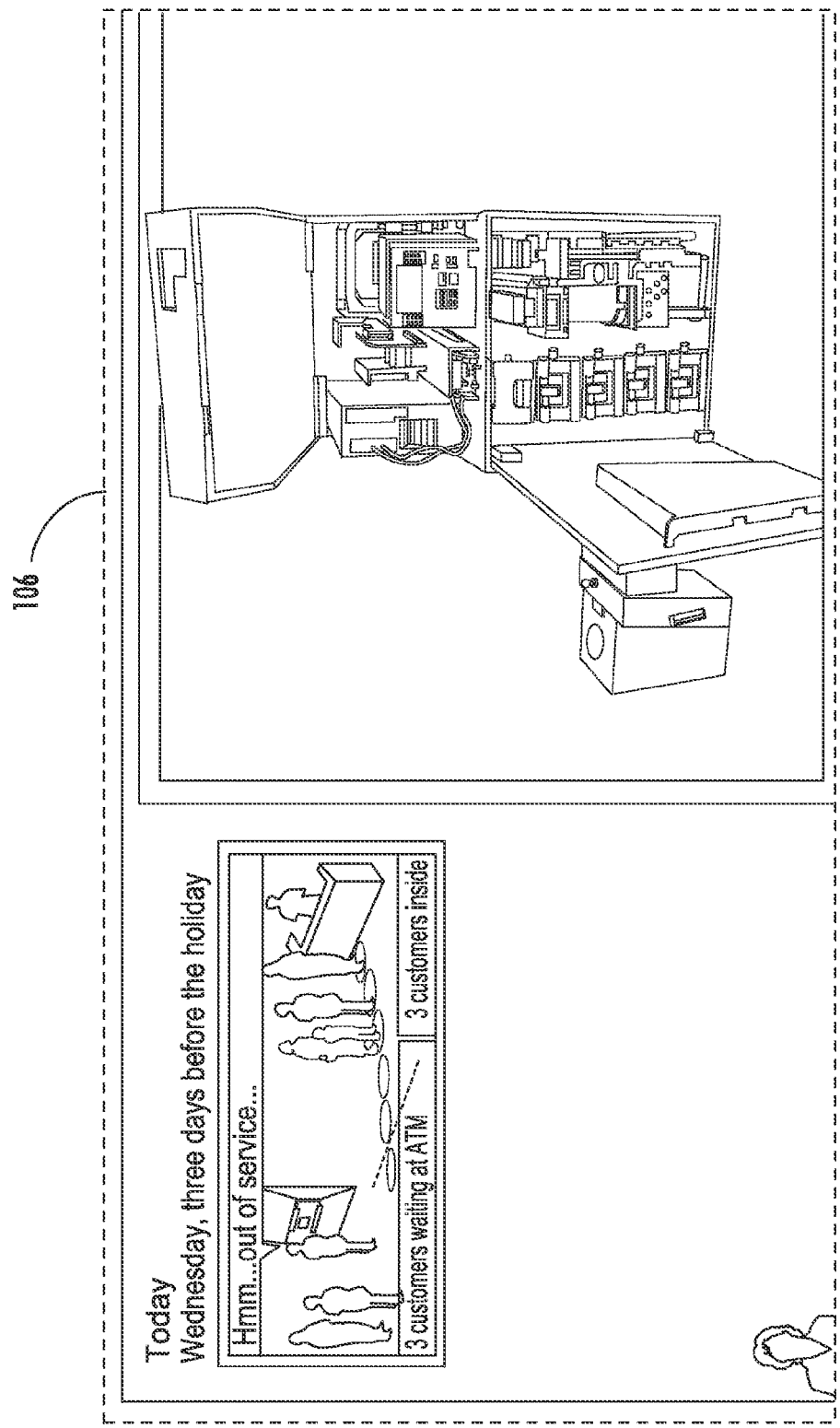
Figure 1:
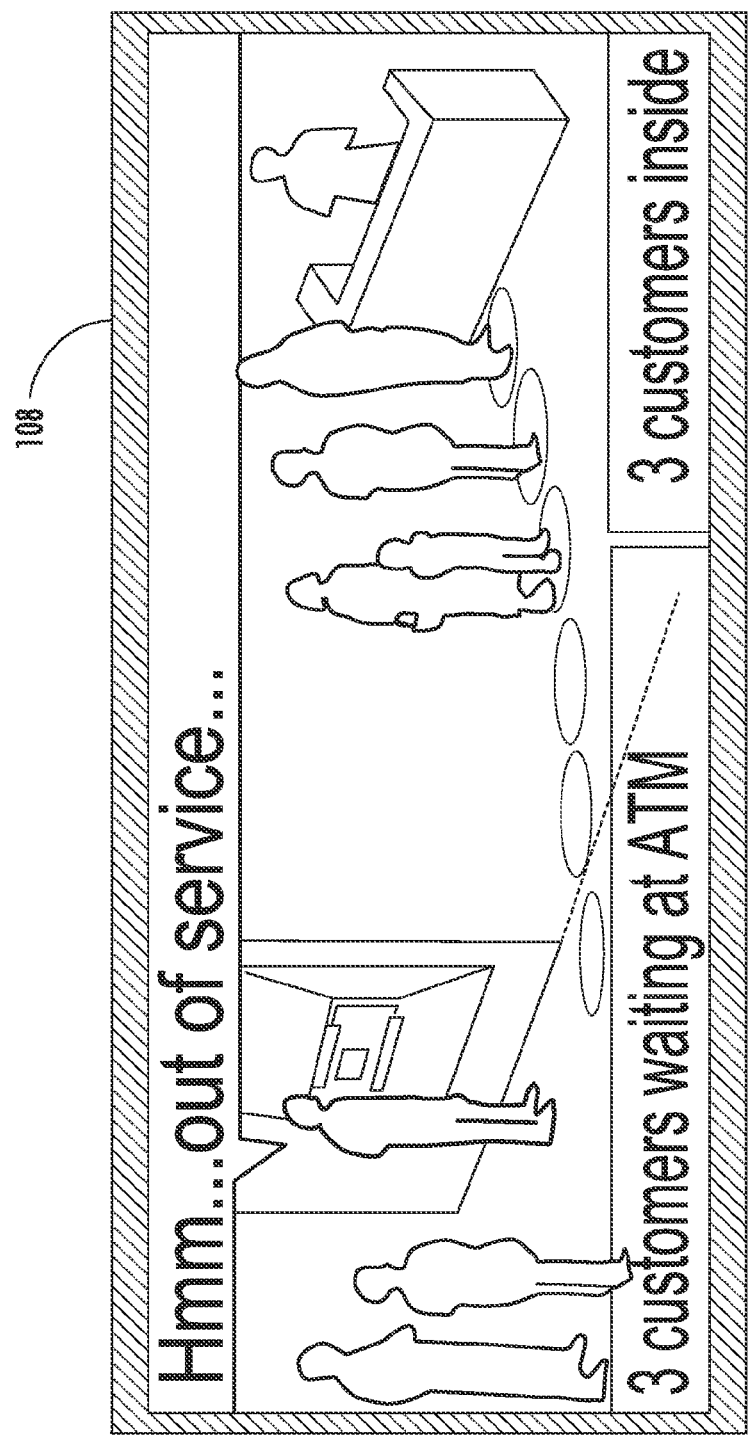

The present invention will now be described in terms of specific, example embodiments. It is to be understood that the invention is not limited to the example embodiments disclosed. It should also be understood that not every feature of the systems and methods described is necessary to implement the invention as claimed in any particular one of the appended claims. Various elements, stages, processes, and features of various embodiments of systems, apparatus, and processes are described in order to fully enable the invention. It should also be understood that throughout this disclosure, where a process or method is shown or described, the steps of the method may be performed in any order or simultaneously, unless it is clear from the context that one step depends on another being performed first. Also, time lags between steps can vary.

Embodiments of the present invention provide a computer software program time feature that simulates the passage of time. The time feature employs a synchronic construct of time, comprising assigning to each action available in the program a specific number of synchronic timekeeping units. An "action" within the confines of the computer software program includes any task or activity in which the user can engage while using the program. Actions are defined by the author of the computer software program.

A "synchronic" construct of time refers to the fact that there are no characteristics of chronology or continuous flow incorporated in the construct of time as it is implemented in embodiments of the present invention. Rather, a certain number of timekeeping units is assigned to each action available in the software program, and the amount of "time" it takes to complete an action is defined solely by the number of timekeeping units assigned. Thus, the time measurement of each action is a separate and individual occurrence. The timekeeping units may be added together to come up with a total time spent performing actions within the program, but there are no aspects of time flow, continuity or chronology associated with calculations of total time passage within the synchronic construct of time described herein.

"Synchronic timekeeping units" are defined by the author of the computer software program and a specific number of the units is assigned to each action available within the program. Synchronic timekeeping units may be converted into measures of "real time" so that the passage of time measured is meaningful to the user of the software program. The number of synchronic timekeeping units assigned to an action may be correlated to how long the action might take in real time, and/or to the importance of the action. All actions have a number of synchronic timekeeping units assigned to them. Thus, any actions taken by the user cause synchronic timekeeping units to accumulate because all actions take time to perform and the units are tracked in an additive way. One of ordinary skill in the art would easily be able to determine effective ways of assigning "synchronic timekeeping units" within the computer software program.

One useful characteristic of the present invention is that the passage of all time within the computer software program is calculated by using the number of synchronic timekeeping units assigned to each action. The passage of real time has no effect on the number of synchronic timekeeping units that accumulate during performance of an action in the software program. This means that if the user is interrupted while performing an action, he or she can later return to the action without being penalized for time spent away from the program. Further, the user is not required to activate a pause feature if interrupted while using the software.

The following description is based on an exemplary implementation of an embodiment of the invention in a video game for use in educating bank employees, such as tellers, to fix and maintain an automated teller machine (ATM). ATMs are high maintenance pieces of equipment, in that they require at least weekly attention for settlement of transactions, replenishment of cash reserves and to ensure that the receipt printer has paper. Further, it is not uncommon for other issues affecting ATM functionality to arise between weekly maintenance sessions, such as problems with the loaded cash (i.e., wrong orientation, or torn or folded bills) or with the receipt printer (paper gets jammed, torn, or runs out). Still further, the ATM may have other difficulties, such as failures by the Bulk Note Acceptor (BNA) as a result of jammed bills. Banks require the ability to address these issues in a timely manner, as non-functioning ATMs cause customer dissatisfaction and bank profit losses. Therefore, an educational video game useful for training bank employees in how to maintain ATMs is an attractive and viable option for banks.

The time feature of the present invention is particularly well suited for video game training that occurs in a busy environment, such as a bank. Tellers may be required to undergo training by playing the game in a work environment where their game play is almost certain to be interrupted due to work duties such as attending to customers. However, the invention is useful in any software program in which there is a desire to offer a timekeeping system that allows use of the software program in an intermittent fashion without penalty to the user and absent the need to remember to activate a pause feature whenever the user wants to disengage from the program.

In summary, and as an exemplary embodiment, the "ATM: Fix, Maintain, or Meltdown™" video game is described in more detail as follows. The object of the game is to fix ATM faults (defined more fully below), or problems, before the banking center line extends out the door with presumably unhappy customers. Based on fault information presented on the ATM servicing screen (also called the rear servicing screen), the user must examine different ATM components in order to identify and correct faults. Corrective action may be taken to "fix" each fault. Exemplary faults include, for example, unfit currency loaded into the ATM, or a receipt printer that has run out of paper. Corrective action may consist of calling an ATM support vendor to fix faults that the bank employee is not equipped to fix. If the line at the banking center extends out the door, the game is lost. Once the game is lost, the user must start over.

"Fixes" are actions that the user can take to correct ATM faults, and are offered to the user via buttons on the screen. Thus, the game provides guidance by offering a limited number of options for correcting each fault.

The "ATM: Fix, Maintain, or Meltdown™" video game is a single-player game that is made up of increasingly difficult rounds of "mini-games". In each mini-game, the virtual ATM is configured to have "faults", and one mini-game gives the user the opportunity to fix all faults currently presented on the ATM. Faults are ATM features that are in need of either a maintenance action or a repair action. The successive mini-games increase in difficulty due to a decreasing amount of help available during each game, as well as decreasing amounts of time in which to complete the repair and maintenance tasks. The game forces the user to navigate through the maintenance and repair process based on an ability to recognize faults and an understanding of when to make the fix themselves and when to call the ATM support vendor for help. The game further imposes a time-sensitive environment in which the fixes must be undertaken, so that the user is forced to prioritize fault fixes in order to succeed in the game.

Two types of faults are utilized in the game. "Emerging" faults are features that do not put the ATM component out of commission immediately as opposed to "immediate" faults, which are features that cause the ATM component to stop performing as soon as they are present. For example, a bunch of strapped bills located at the front of a cash cassette is treated as an immediate fault because the ATM cannot pick a bill from a bunch of strapped bills. Once the ATM attempts to pick a bill from the strap and fails, no more bills can be picked from that cash cassette until appropriate individual bills are provided at the front of the cash cassette. If the strap of bills is located in the middle of the cash cassette, the game treats the situation as an emerging fault as the cash cassette will perform its intended function until the ATM attempts to pick from the strap of bills.

For purposes of the training game, the ATM is divided into multiple components, each of which may require maintenance or repair attention. The ATM components that may be addressed in the game include the cash dispenser, which is made up of multiple cash cassettes; the bulk note acceptor; and the receipt printer. There is an additional fault that may occur when ATM components, such as cash cassettes and receipt printers, are not returned to their original position in the ATM after an action has been performed on them.

Each component may present faults during the game, and the faults presented are representative of what might be encountered when fixing or maintaining a real-life ATM. The cash dispenser is usually made up of several cash cassettes, which are accessed in succession as needed by the ATM. The cash dispenser is one of the most common sources of ATM faults. Cash dispenser faults may include a cassette with unfit currency up front, cash loaded in the wrong orientation, incorrect denominations of bills loaded, straps not removed from packs of bills, or bills not fanned and separated before being placed in the cash cassette. The cash cassettes may also simply run out of bills before the scheduled routine weekly maintenance and may need to be replenished.

The receipt printer is another source of common ATM faults. The receipt printer may run out of paper, the paper may be improperly installed, the wrong type of receipt paper may be loaded, or the paper may become jammed or in some other way be prevented from feeding the printed receipt out to the customer.

Other ATM faults that the user may encounter include hardware failures or a bill jam located in the BNA. Note that anytime the user wants to examine a component, the component must be "unseated". Unseating may require, for example, opening up the component, such as opening up the cash dispenser and pulling out each individual cassette in order to examine the contents. Any component that the user unseats must be reseated before the maintenance or repair is complete and successful. If the user does not reseat the component, a fault will result.

To provide further training to the employee learning how to maintain and repair an ATM, the game further includes a feature wherein the user loses the game immediately if the user tries to repair an ATM feature that he or she should not touch, such as the BNA. ATMS are very expensive (current prices are in the tens of thousands of dollars), and banks do not want untrained employees to inappropriately try to address maintenance and repairs of specialized and expensive equipment. Such maintenance and repair issues should be left to support personnel provided by the ATM vendors. One purpose of the game is to help the user distinguish between repairs and maintenance he or she can perform unaided (thus reducing both the number of costly service calls to the ATM vendor support personnel and the amount of time the machine is non-operational) and repairs that should be left to the ATM vendor support personnel (thus protecting costly ATM components from damage by inexperienced and unknowledgeable employees). If the user tries to unseat an "off-limits" component, the ATM "melts down" (is destroyed) in dramatic fashion and the user immediately loses the game.

The user's final score in the "ATM: Fix, Maintain, or Meltdown™" video game is determined by taking into account the total number of synchronic timekeeping units accumulated due to actions taken by the user, as well as the user's success in recognizing and correcting both immediate and emerging faults. Time accumulates as the sum total of all of the synchronic timekeeping units assigned to each action taken by the user. If too many timekeeping units accumulate, customers will move from standing in line at the ATM to standing in line inside the banking center. If the customer line inside the banking center becomes so long that it extends out the door, the game ends and the user cannot perform any further actions, even if there are still faults outstanding.

User success within the "ATM: Fix, Maintain, or Meltdown™" video game occurs due to user recognition and correction of immediate faults, user recognition and correction of emerging faults, and user efficiency in avoiding unnecessary actions. Users accumulate points for correction of both immediate and emerging faults. However, users are penalized for "taking too long" to make repairs by customer transfers from the line at the ATM to the line inside the banking center. When a customer transfers from the line at the ATM to the line inside the banking center, the user accumulates penalty points. A user's final game score is determined by calculating an additive total of points earned in fixing immediate and emerging faults, and then subtracting the penalty points from the additive total. Thus, users cannot earn points unless they make appropriate repairs. However, users who take unnecessary actions thereby accumulate penalty points which are subtracted from the points earned in making fixes when the final score is calculated.

Following is a description of a series of screen shots of user screens presented during the video game time feature according to example embodiments of the invention. It is understood that the user screen shots provided herein are intended as examples of how the time feature may be presented during a video game and are not meant to be limiting. One of skill in the art would understand that many different presentations of the time feature are possible.

FIG. 1 presents screen shots of user screens for the video game time feature according to example embodiments of the invention. In this example, the time feature is implemented using the functionality of Adobe Flash™. FIG. 1 presents examples of the main screen of the "ATM: Fix, Maintain, or Meltdown™" video game.

The time feature is represented by a depiction of the number of customers in line at the ATM and the number of customers who have moved inside the bank due to dissatisfaction with the nonfunctional ATM. This graphic representation of customers in line represents the current status of the customer line throughout the game, and is located in the upper left corner of the game screen for most of the game's duration (see below for discussion of when the graphic is not in the upper left corner of the game screen). The graphic representation of customers in line is updated as necessary each time an ATM component is unseated and reseated.

Screen shot 102 of FIG. 1 provides an example user screen depicting the customer lines when a game is first initiated. When a game is first begun, there are no customers in line inside the banking center. A zoomed-in version of the same screen shot 104 is provided to show more clearly that there are three customers waiting at the ATM and there are no customers inside the banking center.

Screen shot 106 provides an example user screen depicting the customer lines after a few customers have become dissatisfied with the ATM and moved inside the banking center. A zoomed-in version of the same screen shot 108 is provided to show more clearly that there are three customers waiting at the ATM and three customers inside the banking center. As noted above, a cumulative total of synchronic timekeeping units is kept throughout game play. The transfer of customers from the ATM line to the line inside the banking center occurs each time a preset numerical limit of the cumulative total of synchronic timekeeping units is reached within a mini-game. Customers may transfer individually, or in a group, depending on the magnitude of the cumulative total of synchronic timekeeping units.

Figure 2:
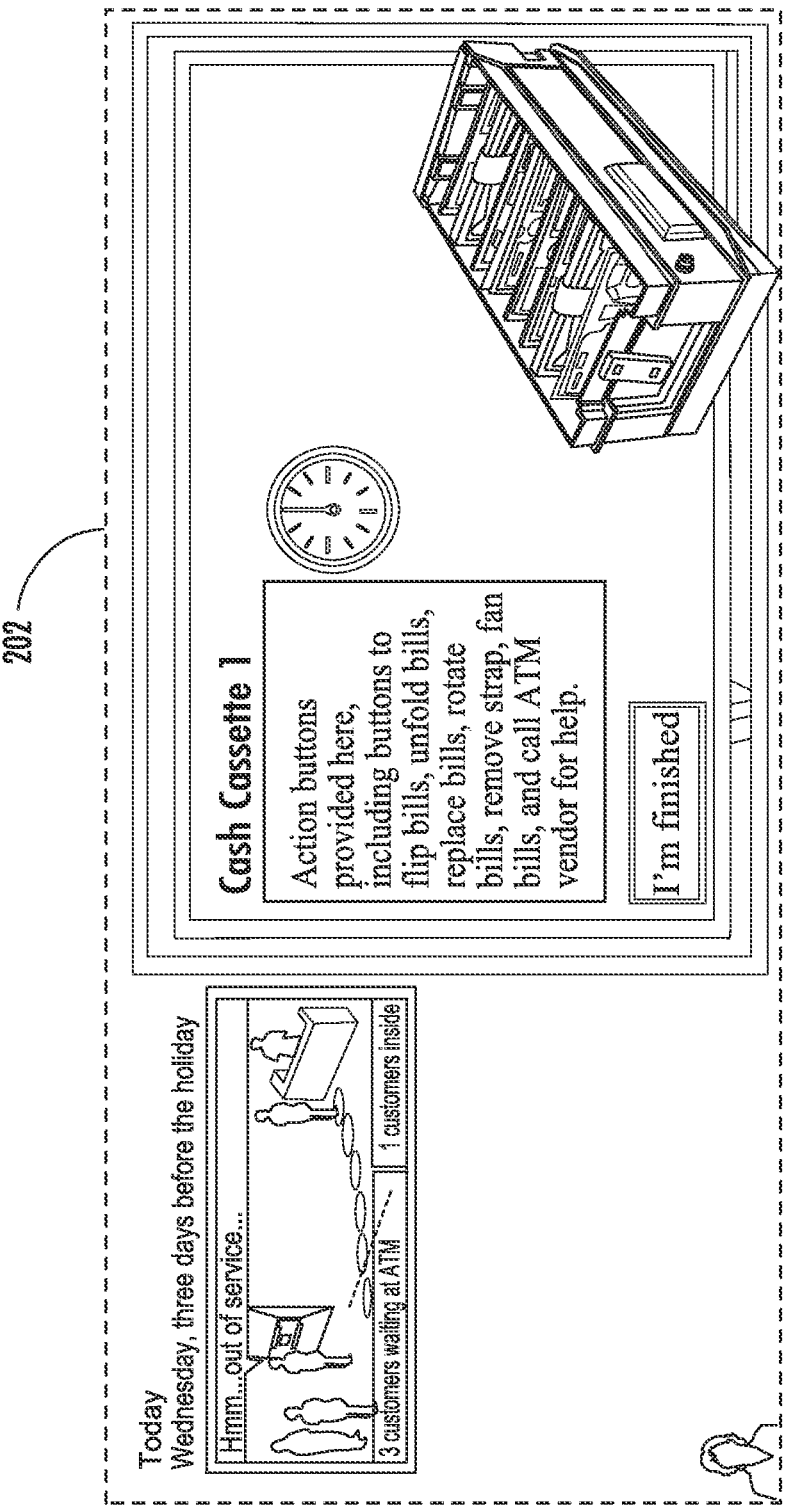
FIG. 2 presents example screen shots of user screens for the time feature.
Figure 2:
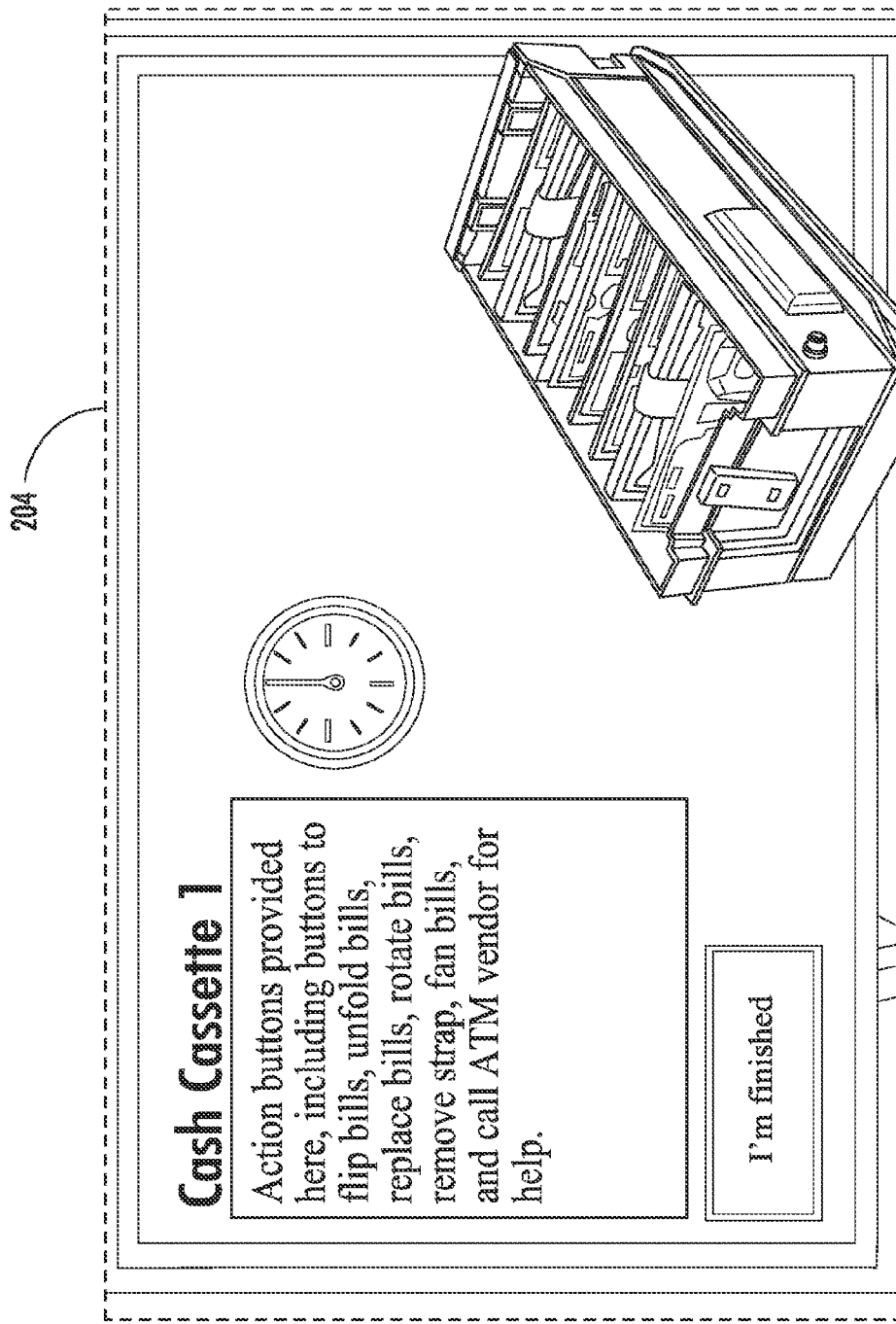
Figure 2:
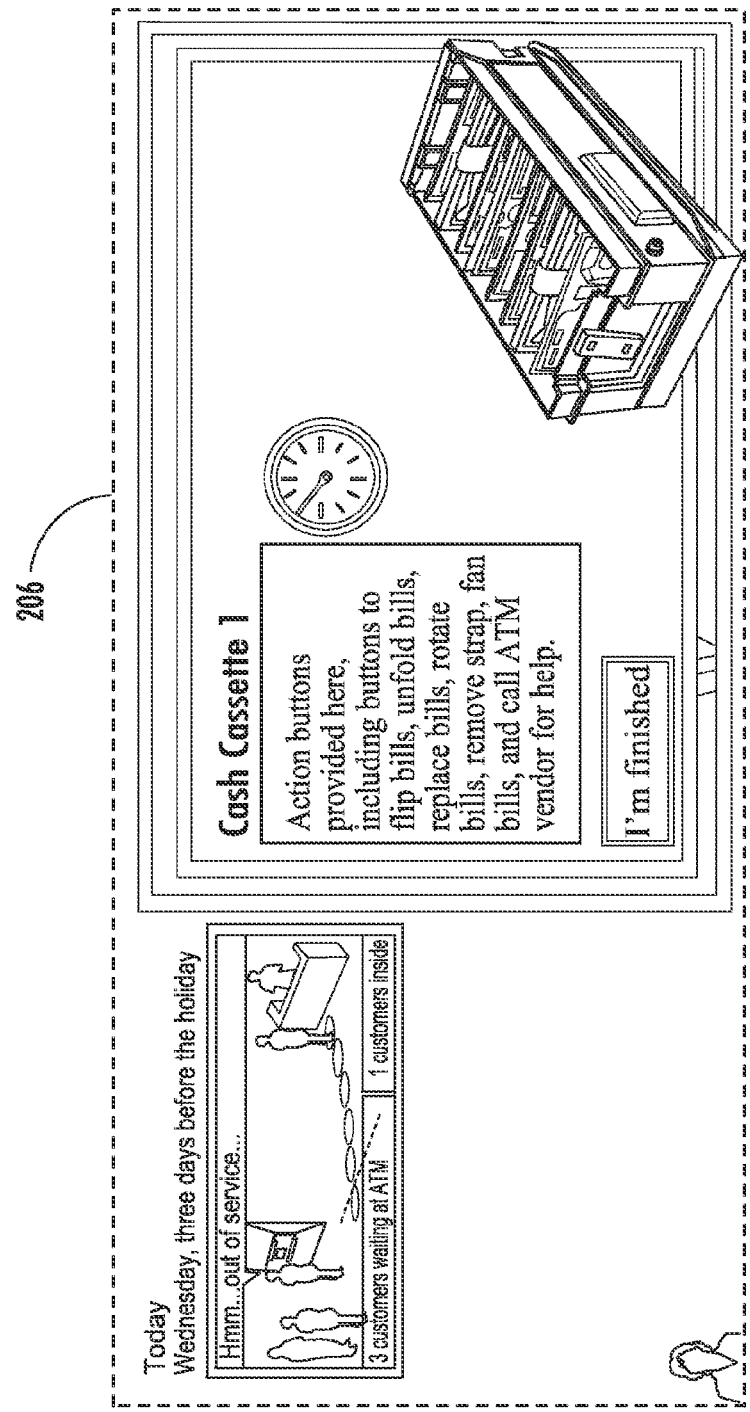
Figure 2:
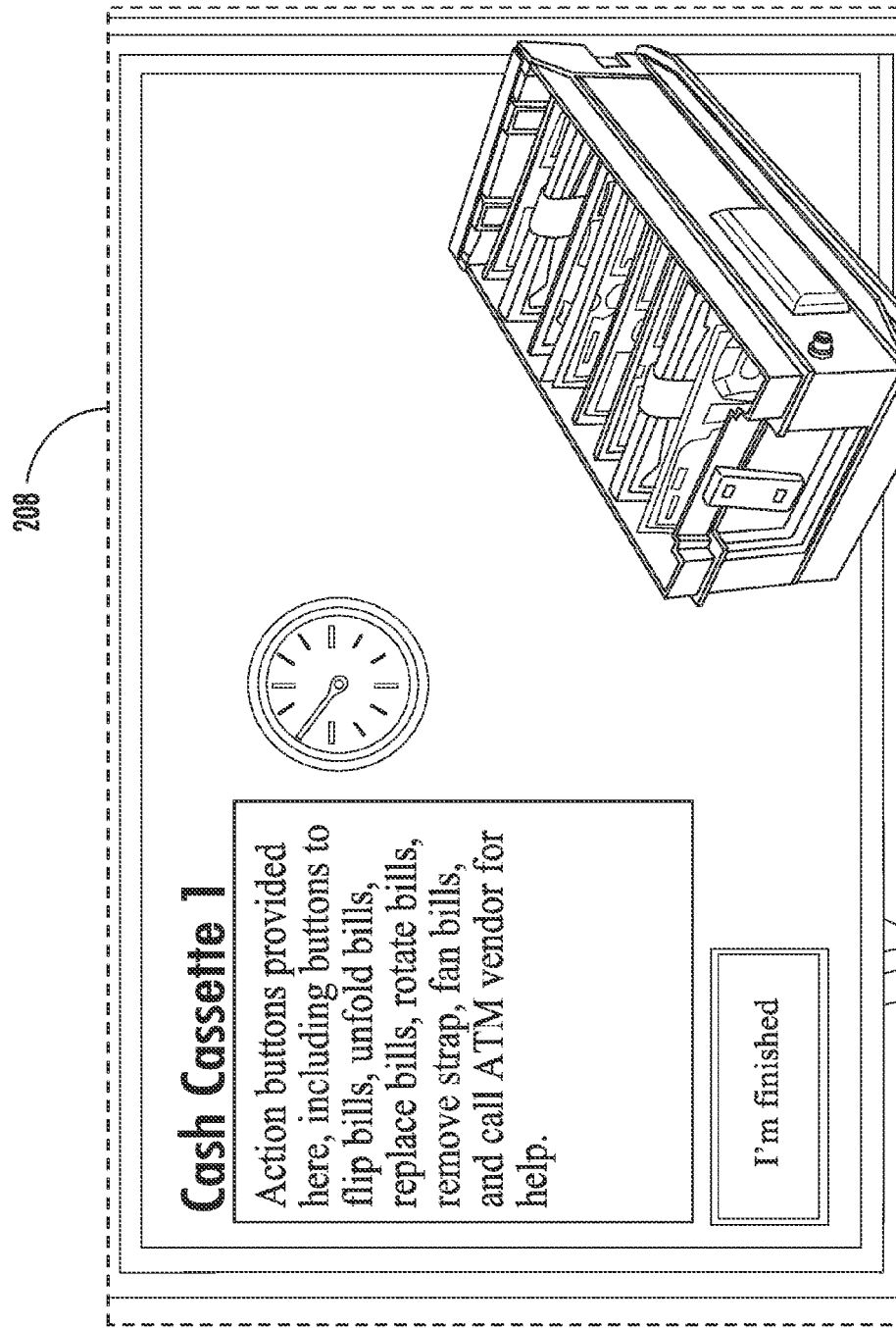

FIG. 2 presents screen shots of user screens for the video game time feature according to example embodiments of the invention. In this example, the time feature is implemented using the functionality of Adobe Flash™. FIG. 2 presents an example of a screen 202 presented after the user has unseated an ATM component, cash cassette 1 in the present example, and is ready to proceed with repair and maintenance actions. FIG. 2 further presents an example of a screen 206 presented after the user has completed repair and maintenance actions on the ATM component. A "clock" representing an adaption of the time feature is depicted. The clock only has one hand, similar to a stop watch. The clock is a visual indication that game time is passing while the user is performing repair and maintenance actions on the ATM. However, game time passes only when the user engages in a game action and the amount of time that passes is measured only by the number of synchronic timekeeping units assigned to each action in which the user engages. If the user engages in more than one action, the number of synchronic timekeeping units that affect the user's score is the sum of the units assigned to all of the actions undertaken.

Customer dissatisfaction increases during the time the ATM is nonfunctional. Time accumulates as the sum total of all of the synchronic timekeeping units assigned to each action taken by the user. If too many timekeeping units accumulate, customers will move from standing in line at the ATM to standing in line inside the banking center. This movement of customers from the ATM line to the line inside the banking center counts heavily against the user in the game. Each time the user undertakes an action to perform on the ATM component, the hand on the "clock" moves forward to indicate that time has passed. At the same time, the number of synchronic timekeeping units assigned to the action will be added to the user's sum total of units accumulated thus far in the game.

Screen shot 202 of FIG. 2 provides an example user screen of the clock feature of the time implementation according to example embodiments of the invention. The clock in screen shot 202 and in the zoomed-in view of the same screen shot 204 has not yet been activated because no actions have yet been undertaken by the user. The clock is present to represent to the user the passage of time when actions are taken in game play.

Screen shot 206 and the zoomed-in view of the same screen shot 208 illustrate an example of what the clock looks like after actions have been taken and time has passed within the video game software program. Screen shots 206 and 208 present a clock whose hand has moved in response to the number of accumulated synchronic timekeeping units associated with the particular actions taken during game play.

Figure 3:
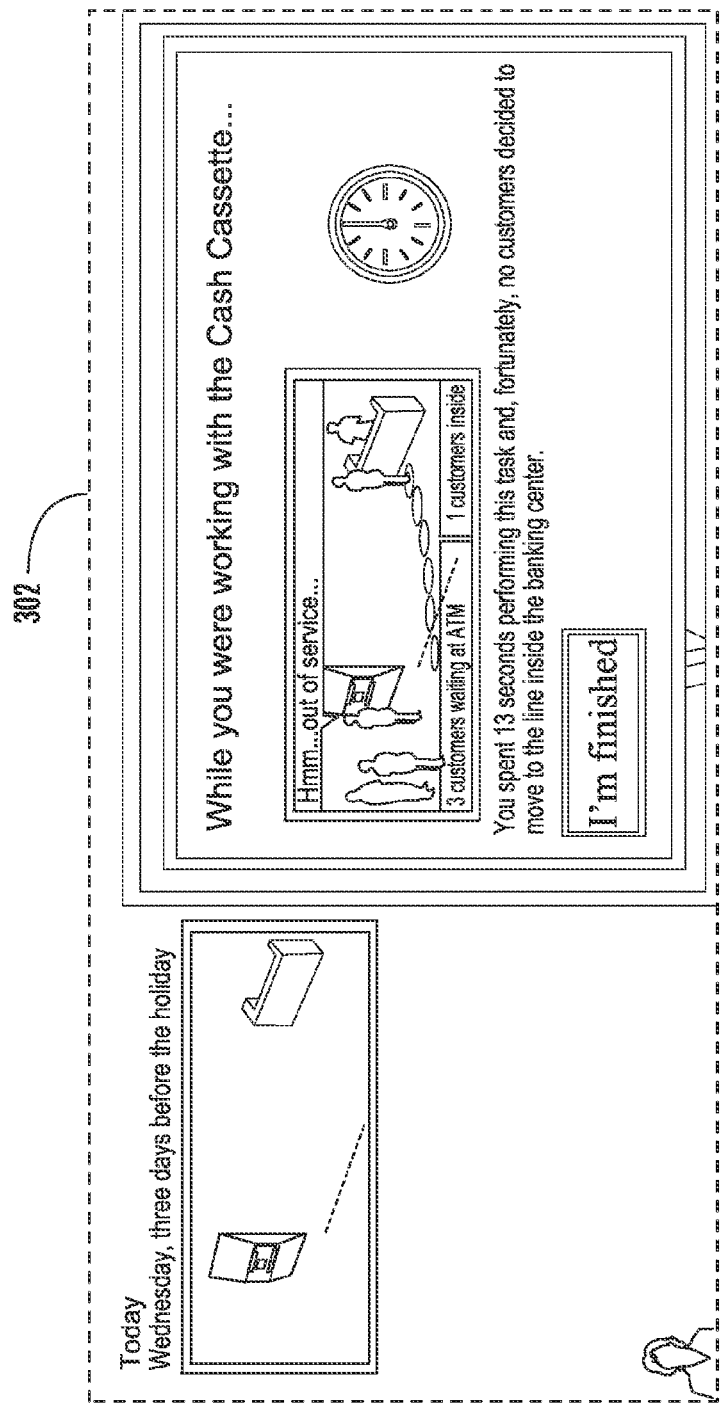
FIG. 3 presents an example screen shot of a user screen for the time feature.
Figure 3:
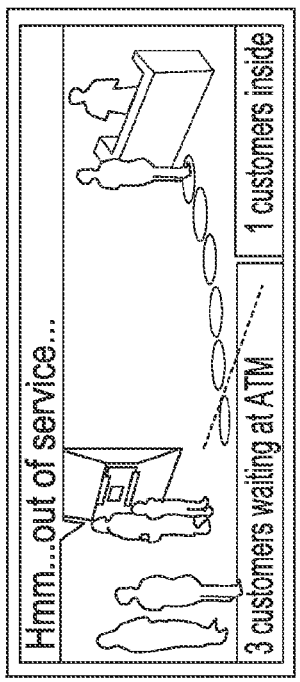

FIG. 3 presents an example screen shot of a user screen for the video game time feature. FIG. 3 presents an example of a screen presented after the user has completed repair and maintenance actions for an ATM component and has pressed the "I'm finished" button which is presented in all of the screen shots of FIG. 2. In this example, the time feature is implemented using the functionality of Adobe Flash™.

Screen shot 302 of FIG. 3 provides an example user screen depicting the clock feature of the time implementation according to example embodiments of the invention. After the user determines that he or she has completed all of the repair and maintenance actions necessary within the ATM component with which the user is working, the user clicks on a button (as depicted on the screens presented in FIG. 2) that says "I'm finished". This causes the software program to present a screen such as the one depicted in screen 302 and in the zoomed-in view of the same screen 304. Screen 302 and zoomed-in view 304 inform the user of how much time passed while they were performing the repair and maintenance actions on the ATM component, which is a cash cassette in this example. The calculation of how much time has passed represents a conversion of the synchronic timekeeping units to a representation of real time. In this example, the real time is represented by text displayed to the user stating that 13 seconds were used in completing the selected actions.

It is with the presentation of screen 302 within the game that the depiction of customers waiting in line moves from the upper left corner of the screen to the middle of the screen, thereby emphasizing whether any customers have moved from the ATM customer line to the line inside the banking center. If the user clicks on the "I'm finished" button on screen 302, the software program closes screen 302 and presents the main game screen, with the customer lines once again depicted in the upper left corner.

Figure 4:
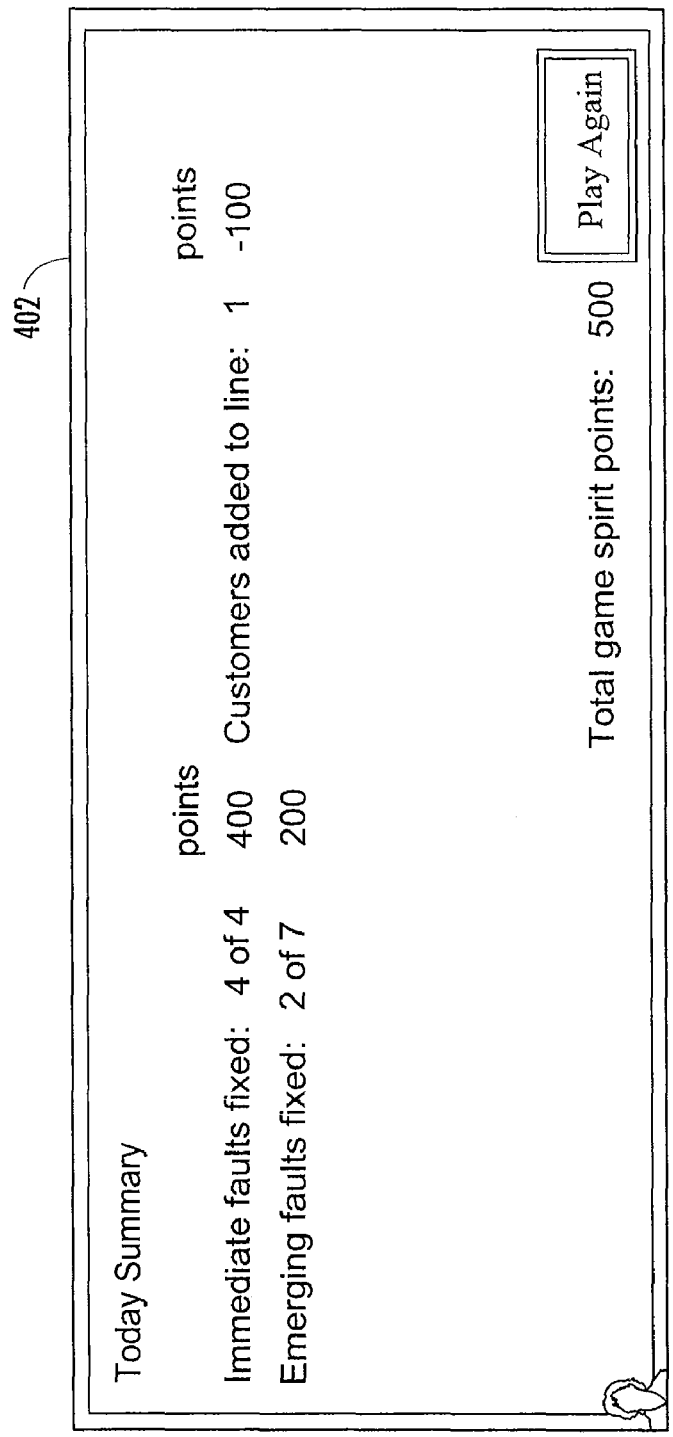
FIG. 4 presents an example screen shot of a user screen for the time feature.

FIG. 4 presents an example screen shot of a user screen for the video game time feature. FIG. 4 presents an example of a screen that the user sees when the user determines that he or she has completed all necessary repair and maintenance actions for the ATM. A screen 402 is presented to the user that shows a final tally of the user's game score. Time is not represented directly to the user on the screen 402, but is indirectly indicated by the total numbers of points awarded. For example, total score is determined by measuring user performance in fixing immediate and emerging faults minus the number of customers added to the line inside the banking center. The number of accumulated synchronic timekeeping units associated with the particular actions taken during game play determine when each customer is added to the line inside the banking center. The total number of synchronic timekeeping units required to trigger the movement of a customer from the ATM line to the line inside the banking center is predetermined by the author of the computer software program.

Figure 5:
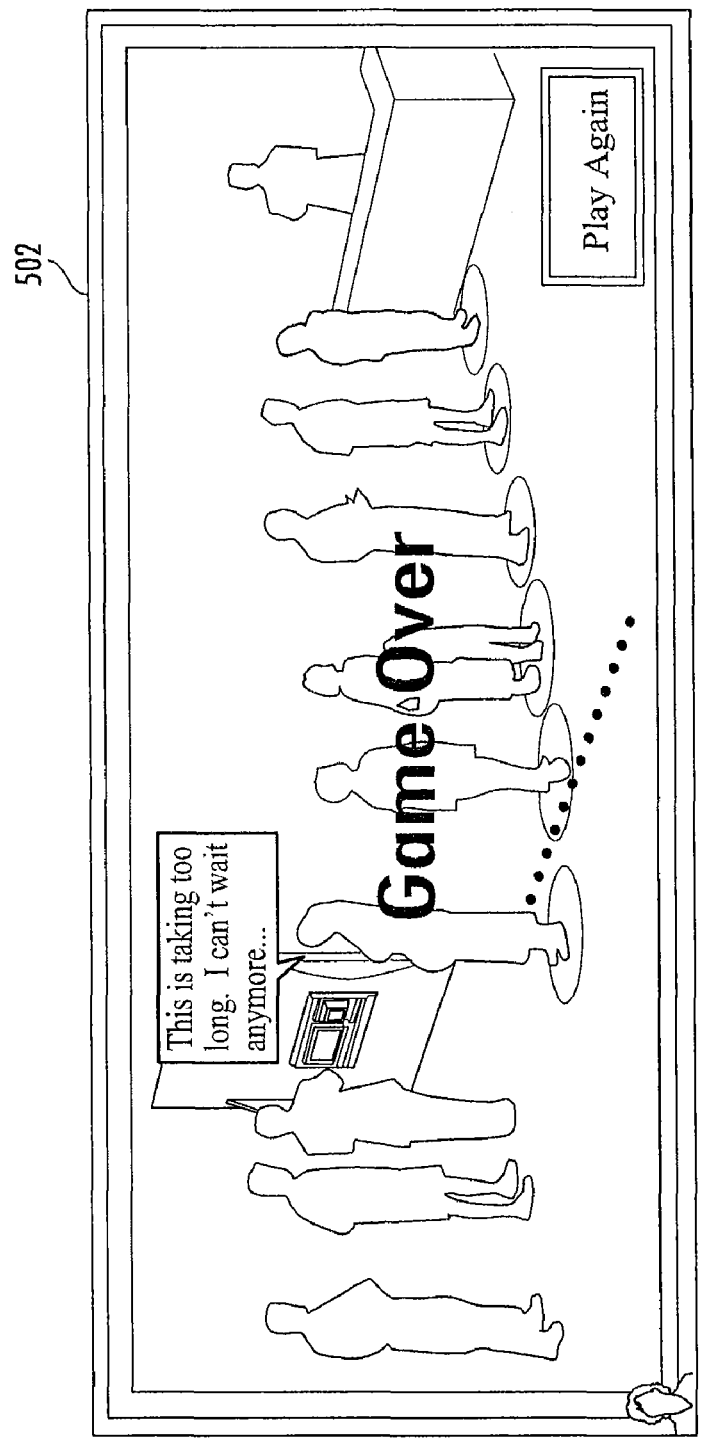
FIG. 5 presents an example screen shot of a user screen for the time feature.

FIG. 5 presents an example screen shot of a user screen for the video game time feature. FIG. 5 presents an example of a screen that the user sees when the user has taken so long with repair and maintenance actions that the customer line from inside the banking center extends all the way out the door. When this happens, the user immediately and automatically loses the game and sees the screen depicted in FIG. 5. Screen 502 is presented only when the user takes a very long time, as defined in the software program, to complete maintenance and repair of an ATM component. The specific number of synchronic timekeeping units required to trigger the showing of screen 502 (and the end of the game) is defined by the author of the software program.

Figure 6:
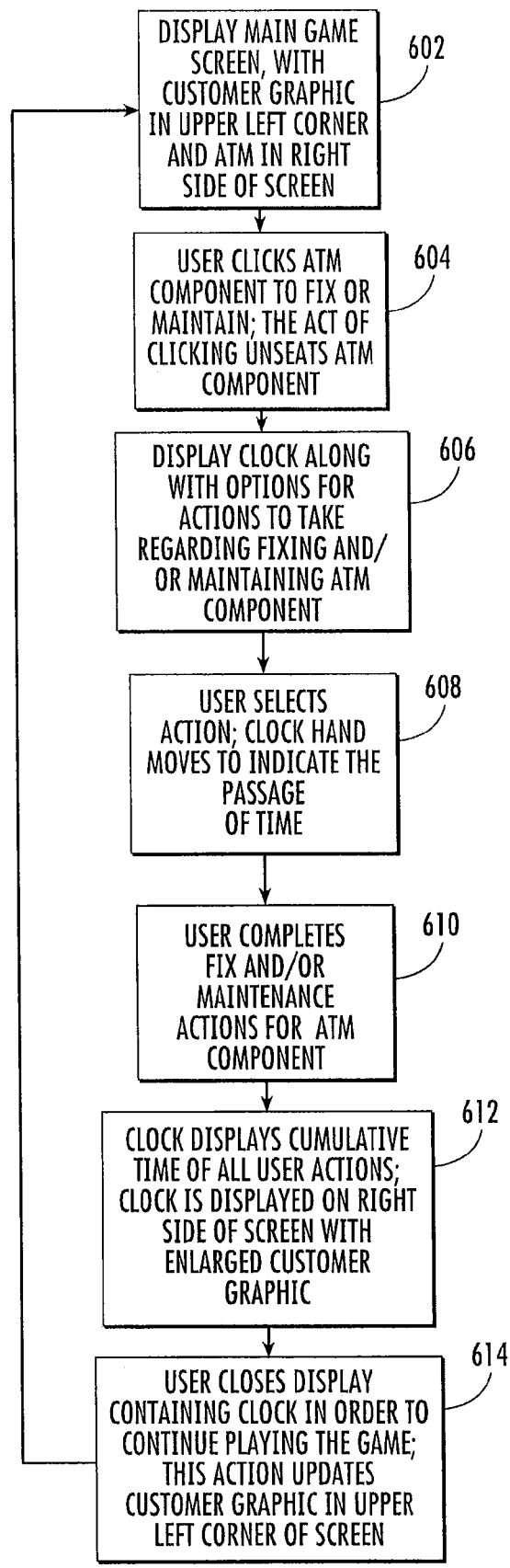
FIG. 6 is a flowchart that illustrates a method of using the time feature according to example embodiments of the invention.

FIG. 6 is a flowchart that illustrates an example embodiment of the present invention. The flowchart is organized as a series of process blocks. In particular, the flowchart presents an embodiment of the present invention utilized in the "ATM: Fix, Maintain, or Meltdown™" video game. Upon initial access to an event, such as the main game screen when first entering the game, the time feature displays in the upper left corner of the main screen as a customer graphic at block 602. The customer graphic depicts customers in line at the ATM and customers in line inside the banking center, as shown in FIG. 1. When a game is first initiated, there are not yet any customers in line inside the banking center. Customers move inside as time passes during corrective actions ("fixes") and maintenance actions that are performed on the ATM. The precise number of synchronic timekeeping units that prompts the game to depict a customer moving to the line inside the banking center is defined by the author of the computer software program.

Once the user has initiated a game, the ATM is depicted on the right side of the game screen. The user views the rear servicing screen to determine which ATM components are in need of a fix or maintenance action. The user then selects an ATM component to fix or maintain by clicking on the component. The act of clicking on the component unseats the component at block 604.

When the user unseats an ATM component, a screen is displayed comprising a clock-like component and a number of buttons, each describing an action that the user can take to repair or maintain the ATM component at block 606. Such a screen is depicted in FIG. 2. The clock-like component is similar to a stopwatch in that it has only a single hand that marks the passage of time with each action the user performs at block 608. In this way, the clock serves as a visual cue to the user that time is passing within the game. The user is aware that the passage of time is critical because as time passes, customers may become dissatisfied with waiting for the ATM to be repaired and move inside the banking center to conduct their business.

At block 610, when the user is satisfied that he or she has completed all of the necessary corrective and/or maintenance actions for the ATM component, the user clicks a button that says "I'm finished". When the "I'm finished" button is clicked, a screen displaying the clock and an updated customer graphic is presented at block 612 and as shown in FIG. 3. The customer graphic shows whether any customers have moved from the ATM line to the line inside the banking center. The display at block 612 is the only point during the game that the customer graphic is enlarged and displayed on the right side of the screen rather than in the upper left corner. This brings to the user's attention any change in the number of customers who have moved to the line inside the banking center.

When the user is finished with the screen displayed at block 612, the user closes the display of the clock and updated customer graphic at block 614 so that he or she can continue playing the game. Upon closing the screen displaying the clock and updated customer graphic, the main game screen is again displayed with the now-updated customer graphic in the upper left corner of the screen at block 602.

Figure 7:
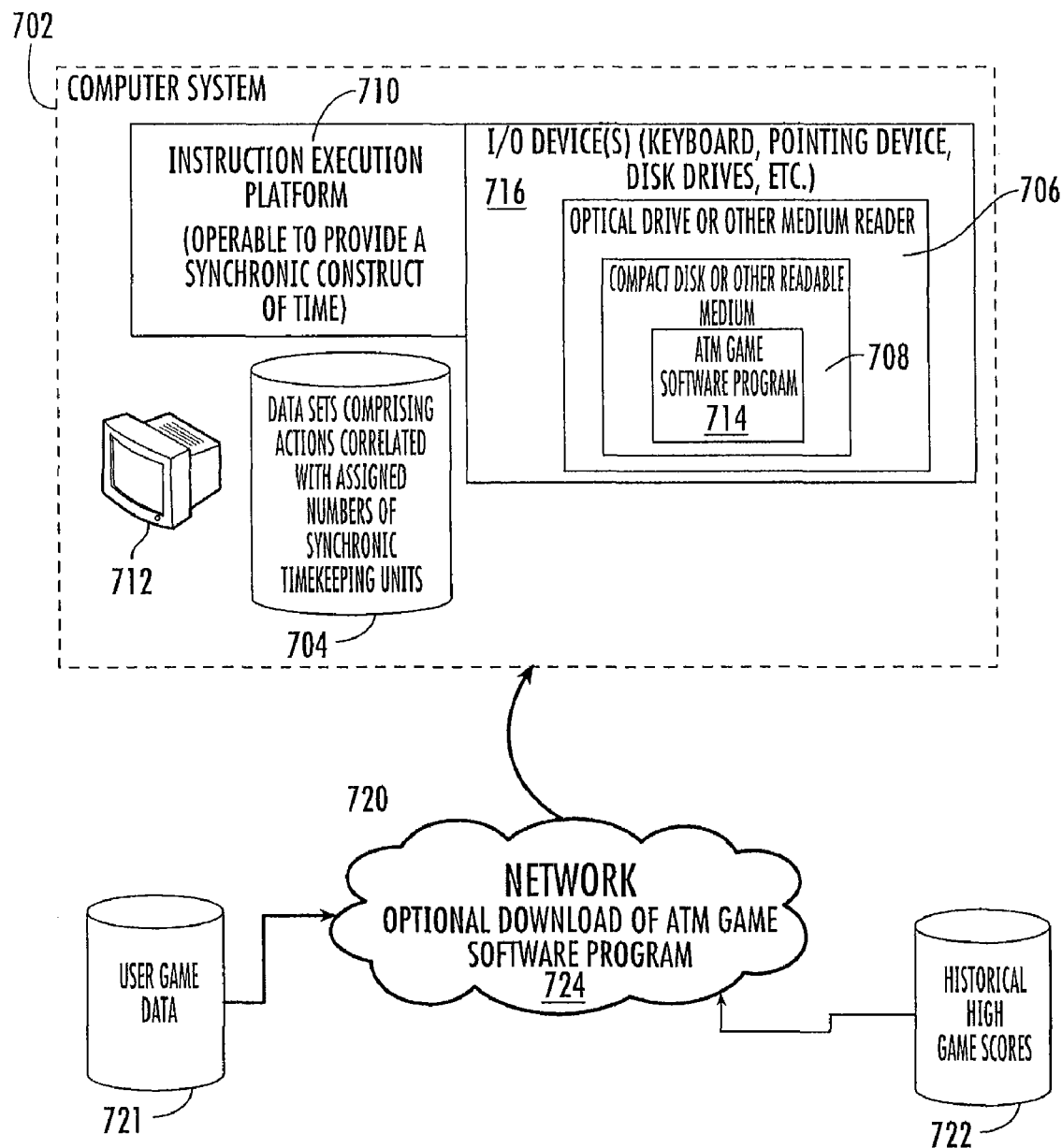
FIG. 7 is a system block diagram according to example embodiments of the invention.

FIG. 7 is a system block diagram according to example embodiments of the invention. FIG. 7 actually illustrates two alternative embodiments of a system implementing the invention. System 702 can be a workstation or personal computer. System 702 can be operated in a "stand-alone" mode. The system includes a fixed storage medium, illustrated graphically at 704, for storing programs and/or macros which enable the use of an embodiment of the invention. In a stand-alone implementation of the invention, fixed storage 704 can also include the data sets which are necessary to implement an embodiment of the invention. In this particular example, the input/output devices 716 include an optical drive 706 connected to the computing platform for loading the appropriate computer program product into system 702 from an optical disk 708. The computer program product includes a computer program or programs with instructions or code for carrying out the methods of the invention. Instruction execution platform 710 of FIG. 7 includes a microprocessor and supporting circuitry and can execute the appropriate instructions and display appropriate screens on display device 712.

FIG. 7 also illustrates another embodiment of the invention in which case the system 720 which is implementing the invention includes a connection to data stores, from which user data and historical high game scores can be retrieved, as shown at 721 and 722, respectively. The connection to the data stores or appropriate databases can be formed in part by network 724, which can be an intranet, virtual private network (VPN) connection, local area network (LAN) connection, or any other type of network resources, including the Internet. Data sets can be local, for example on fixed storage 704, or stored on the network, for example in data store 721 or 722.

A computer program which implements all or parts of the invention through the use of systems like those illustrated in FIG. 7 can take the form of a computer program product residing on a computer usable or computer readable storage medium. Such a computer program can be an entire application to perform all of the tasks necessary to carry out the invention, or it can be a macro or plug-in which works with an existing general purpose application such as a spreadsheet or database program. Note that the "medium" may also be a stream of information being retrieved when a processing platform or execution system downloads the computer program instructions through the Internet or any other type of network. Computer program instructions which implement the invention can reside on or in any medium that can contain, store, communicate, propagate or transport the program for use by or in connection with any instruction execution system, apparatus, or device. Any suitable computer usable or computer readable medium may be utilized. The computer usable or computer readable medium may be, for example but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires; a tangible medium such as a portable computer diskette, a hard disk, a random access memory (RAM), a read-only memory (ROM), an erasable programmable read-only memory (EPROM or flash memory), a compact disc read-only memory (CD-ROM), or other optical or magnetic storage device; or transmission media such as those supporting the Internet or an intranet. Note that the computer usable or computer readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Specific embodiments of an invention are described herein. One of ordinary skill in the computing and video game arts will recognize that the invention can be applied in other environments and in other ways. It should also be understood that an implementation of the invention can include features and elements or steps in addition to those described and claimed herein. Thus, the following claims are not intended to limit the scope of the invention to the specific embodiments described herein.

The invention claimed is:

1. A method of implementing a time feature within a video game program for teaching a user how to maintain and repair an ATM, comprising:
   providing a synchronic construct of time, wherein time passes within the computer software program only when an action is undertaken within the program;
   assigning a specific number of synchronic timekeeping units to each action available within the program;
   presenting to the user faults associated with an ATM, wherein the faults comprise immediate faults, which cause the ATM to immediately stop performing, and emerging faults, which do not cause the ATM to immediately stop performing, wherein the user is required to take corrective action to fix the faults, and wherein the emerging faults will become immediate faults if the user fails to remedy the emerging faults in a predetermined amount of time; and
   determining a game score, wherein the game score is determined at least in part by the user's success in fixing immediate faults and emerging faults.

2. The method of claim 1, wherein the number of synchronic timekeeping units assigned to the action approximates how long the action might take in real time.

3. The method of claim 1, wherein the number of synchronic timekeeping units assigned to the action is used to weight action importance.

4. The method of claim 1, wherein the synchronic construct of time is converted to a representation of real time.

5. The method of claim 4, wherein the representation of real time comprises a clock-like icon presented on-screen to the user.

6. The method of claim 1, wherein a cumulative total of synchronic timekeeping units from all actions taken during the game is calculated throughout the game.

7. The method of claim 1, wherein the ATM has a plurality of components.

8. The method of claim 1, wherein at least one fault associated with the ATM comprises at least one fix the user may input to remedy the at least one fault.

9. The method of claim 1, wherein the synchronic construct of time is converted to a representation of real time comprising a depiction of customers standing in line at the ATM.

10. The method of claim 9, wherein the customers may transfer from the line at the ATM to a line inside a banking center to which the ATM is attached.

11. The method of claim 10, wherein the transfer of customers from the line at the ATM to the line inside the banking center is triggered when a preset numerical limit of the cumulative total of synchronic timekeeping units is reached.

12. The method of claim 11, wherein the transfer of customers from the line at the ATM to the line inside the banking center results in an accumulation of penalty points.

13. The method of claim 1, wherein the ATM comprises at least one component that is off-limits to the user.

14. A non-transitory computer readable medium for implementing a time feature within a video game program for teaching a user how to maintain and repair an ATM, the computer readable medium including computer program code comprising:
   instructions for providing a synchronic construct of time, wherein time passes within the computer software program only when an action is undertaken within the program;
   instructions for assigning a specific number of synchronic timekeeping units to each action available within the program;
   instructions for presenting to the user faults associated with an ATM, wherein the faults comprise immediate faults, which cause the ATM to immediately stop performing, and emerging faults, which do not cause the ATM to immediately stop performing, wherein the user is required to take corrective action to fix the faults, and wherein the emerging faults will become immediate faults if the user fails to remedy the emerging faults in a predetermined amount of time; and
   instructions for determining a game score at least in part by the user's success in fixing immediate faults and emerging faults.

15. The computer readable medium of claim 14, wherein the number of synchronic timekeeping units assigned to the action approximates how long the action might take in real time.

16. The computer readable medium of claim 14, wherein the number of synchronic timekeeping units assigned to the action is used to weight action importance.

17. The computer readable medium of claim 14, wherein the synchronic construct of time is converted to a representation of real time.

18. The computer readable medium of claim 14, wherein the representation of real time comprises a clock-like icon presented on-screen to the user.

19. The computer readable medium of claim 14, wherein a cumulative total of synchronic timekeeping units from all actions taken during the game is calculated throughout the game.

20. The computer readable medium of claim 14, wherein the ATM has a plurality of components.

21. The computer readable medium of claim 14, wherein the at least one fault associated with the ATM comprises at least one fix the user may input to remedy the at least one fault.

22. The computer readable medium of claim 14, wherein the synchronic construct of time is converted to a representation of real time comprising a depiction of customers standing in line at the ATM.

23. The computer readable medium of claim 22, wherein the customers may transfer from the line at the ATM to a line inside a banking center to which the ATM is attached.

24. The computer readable medium of claim 23, wherein the transfer of customers from the line at the ATM to the line inside the banking center is triggered when a preset numerical limit of the cumulative total of synchronic timekeeping units is reached.

25. The computer readable medium of claim 24, wherein the transfer of customers from the line at the ATM to the line inside the banking center results in an accumulation of penalty points.

26. The computer readable medium of claim 25, wherein a user's final game score is determined by calculating an additive total of points earned in fixing immediate and emerging faults, and subtracting the penalty points from the additive total.

27. The computer readable medium of claim 14, wherein the ATM comprises at least one component that is off-limits to the user.

28. A system for implementing a time feature within a video game program for teaching a user how to maintain and repair an ATM, the system comprising:
an instruction execution platform operable to:
provide a synchronic construct of time, wherein time passes within the computer software program only when an action is undertaken within the program;
present to the user faults associated with an ATM, wherein the faults comprise immediate faults, which cause the ATM to immediately stop performing, and emerging faults, which do not cause the ATM to immediately stop performing, wherein the user is required to take corrective action to fix the faults, and wherein the emerging faults will become immediate faults if the user fails to remedy the emerging faults in a predetermined amount of time; and
compute a game score, the game score being determined at least in part by the user's success in fixing the immediate faults and emerging faults; and
a data set comprising assignments of specific numbers of synchronic timekeeping units to each action available within the program, the data set being disposed to be accessed by the instruction execution platform.

29. The method of claim 13, wherein the video game program automatically ends if the user attempts to interact with a component that is off-limits.

30. The computer readable medium of claim 27, wherein the computer program code further comprises instructions for automatically ending the video game if the user attempts to interact with a component that is off-limits.

* * * * *